(12) United States Patent
Kameyama et al.

(10) Patent No.: US 9,129,149 B2
(45) Date of Patent: Sep. 8, 2015

(54) INFORMATION PROCESSING APPARATUS, METHOD, AND PROGRAM

(75) Inventors: Hirokazu Kameyama, Kanagawa-ken (JP); Kouji Yamaguchi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 891 days.

(21) Appl. No.: 13/090,083

(22) Filed: Apr. 19, 2011

(65) Prior Publication Data

US 2011/0255802 A1 Oct. 20, 2011

(30) Foreign Application Priority Data

Apr. 20, 2010 (JP) .................................. 2010/096855

(51) Int. Cl.
*G06K 9/00* (2006.01)
(52) U.S. Cl.
CPC .................. *G06K 9/00275* (2013.01)
(58) Field of Classification Search
CPC .......... G06K 9/00275; G06K 9/00281; G06K 9/6247; G06K 9/6232; G06K 9/522
USPC ........................................................ 382/278
See application file for complete search history.

(56) References Cited

U.S. PATENT DOCUMENTS

| 5,164,992 | A | * | 11/1992 | Turk et al. | 382/118 |
|---|---|---|---|---|---|
| 5,379,352 | A | * | 1/1995 | Sirat et al. | 382/276 |
| 5,414,623 | A | * | 5/1995 | Lu et al. | 382/131 |
| 5,432,821 | A | * | 7/1995 | Polydoros et al. | 375/340 |
| 5,819,258 | A | * | 10/1998 | Vaithyanathan et al. | 707/692 |
| 5,943,442 | A | * | 8/1999 | Tanaka et al. | 382/216 |
| 6,044,168 | A | * | 3/2000 | Tuceryan et al. | 382/118 |
| 6,067,369 | A | * | 5/2000 | Kamei | 382/125 |
| 6,081,753 | A | * | 6/2000 | Meitzler et al. | 700/90 |
| 6,345,109 | B1 | * | 2/2002 | Souma et al. | 382/118 |
| 6,628,811 | B1 | * | 9/2003 | Nagao et al. | 382/118 |
| 6,628,821 | B1 | * | 9/2003 | Covell et al. | 382/155 |

(Continued)

FOREIGN PATENT DOCUMENTS

| JP | 2005-122388 A | 5/2005 |
|---|---|---|
| JP | 2005-133813 A | 5/2005 |

(Continued)

OTHER PUBLICATIONS

Japanese Office Action dated Oct. 15, 2013, issued in corresponding Japanese Patent Application No. 2010-096855 (partial English translation is provided).

*Primary Examiner* — Gandhi Thirugnanam
(74) *Attorney, Agent, or Firm* — Birch, Stewart, Kolasch & Birch, LLP

(57) ABSTRACT

Disclosed is a method for accurately and efficiently detecting a modality of input data, including the steps of projecting the input data into a plurality of projection data using each of a plurality of transformation matrix groups $U_1 \cdot (\Sigma_{12} U_2^T)$, generating a plurality of inverse projection data by performing inverse projection of the transformation matrix groups on the plurality of generated projection data, calculating a correlation between the input data and the generated inverse projection data with respect to each transformation matrix group $U_1 \cdot (\Sigma_{12} U_2^T)$, and identifying a modality represented by a transformation matrix group having a highest calculated correlation as the modality of the input data.

6 Claims, 5 Drawing Sheets

(56) References Cited

U.S. PATENT DOCUMENTS

| | | | |
|---|---|---|---|
| 6,665,335 B1 * | 12/2003 | Rajagopal et al. | 375/224 |
| 6,826,300 B2 * | 11/2004 | Liu et al. | 382/159 |
| 6,888,955 B2 * | 5/2005 | Masumoto et al. | 382/118 |
| 6,931,363 B2 * | 8/2005 | Andoh et al. | 702/196 |
| 7,133,048 B2 * | 11/2006 | Brand | 345/582 |
| 7,224,823 B2 * | 5/2007 | Hayata et al. | 382/118 |
| 7,693,351 B2 * | 4/2010 | Sasaki | 382/300 |
| 7,817,826 B2 * | 10/2010 | Chen | 382/118 |
| 7,899,253 B2 * | 3/2011 | Porikli et al. | 382/190 |
| 8,605,118 B2 * | 12/2013 | Kameyama | 345/660 |
| 2001/0028731 A1 * | 10/2001 | Covell et al. | 382/118 |
| 2001/0047424 A1 * | 11/2001 | Alastalo et al. | 709/236 |
| 2002/0126779 A1 * | 9/2002 | Denno | 375/346 |
| 2003/0026484 A1 * | 2/2003 | O'Neill | 382/224 |
| 2003/0086593 A1 * | 5/2003 | Liu et al. | 382/118 |
| 2003/0139926 A1 * | 7/2003 | Jia et al. | 704/236 |
| 2003/0165260 A1 * | 9/2003 | Kim et al. | 382/118 |
| 2003/0169908 A1 * | 9/2003 | Kim et al. | 382/118 |
| 2003/0236661 A1 * | 12/2003 | Burges et al. | 704/205 |
| 2004/0022432 A1 * | 2/2004 | Hayata et al. | 382/159 |
| 2004/0170305 A1 * | 9/2004 | Kim et al. | 382/118 |
| 2004/0208390 A1 * | 10/2004 | Jiang et al. | 382/260 |
| 2004/0209237 A1 * | 10/2004 | Flewelling et al. | 435/4 |
| 2004/0225478 A1 * | 11/2004 | Andoh et al. | 702/196 |
| 2004/0243328 A1 * | 12/2004 | Rapp et al. | 702/71 |
| 2005/0220335 A1 * | 10/2005 | Budd | 382/152 |
| 2005/0238238 A1 * | 10/2005 | Xu et al. | 382/224 |
| 2005/0265607 A1 * | 12/2005 | Chang | 382/224 |
| 2006/0013454 A1 * | 1/2006 | Flewelling et al. | 382/128 |
| 2006/0020401 A1 * | 1/2006 | Davis et al. | 702/30 |
| 2006/0239471 A1 * | 10/2006 | Mao et al. | 381/92 |
| 2008/0279424 A1 * | 11/2008 | Berrani et al. | 382/118 |
| 2010/0086224 A1 * | 4/2010 | Demirci et al. | 382/238 |
| 2010/0111370 A1 * | 5/2010 | Black et al. | 382/111 |
| 2010/0150452 A1 * | 6/2010 | Kamei | 382/202 |
| 2011/0249001 A1 * | 10/2011 | Kameyama | 345/428 |
| 2011/0255802 A1 * | 10/2011 | Kameyama et al. | 382/278 |

FOREIGN PATENT DOCUMENTS

| | | |
|---|---|---|
| JP | 2005-250863 A | 9/2005 |
| JP | 2006-92151 A | 4/2006 |
| JP | 2009-134466 A | 6/2009 |

* cited by examiner

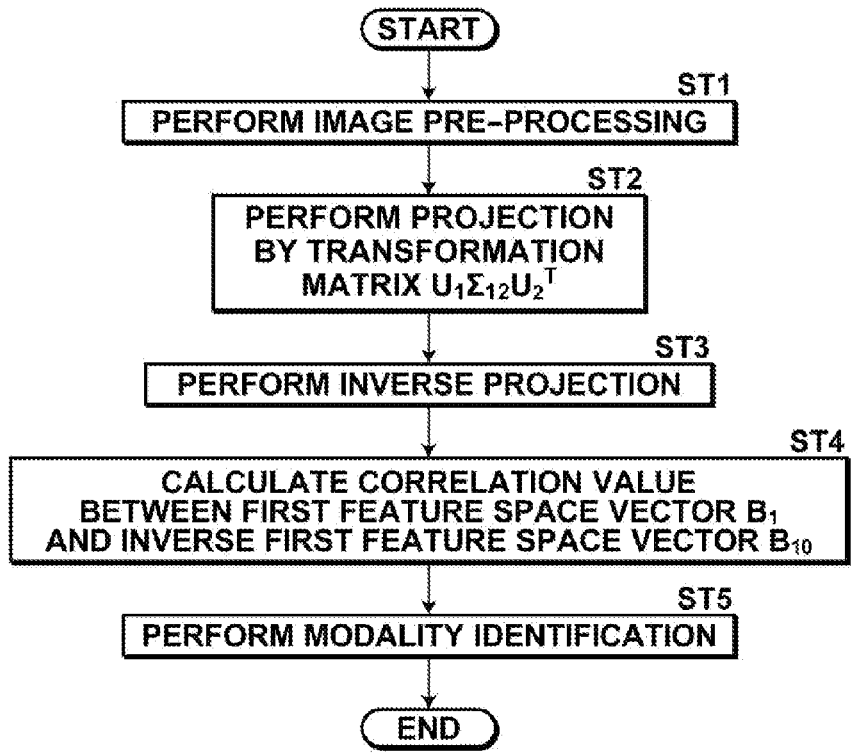
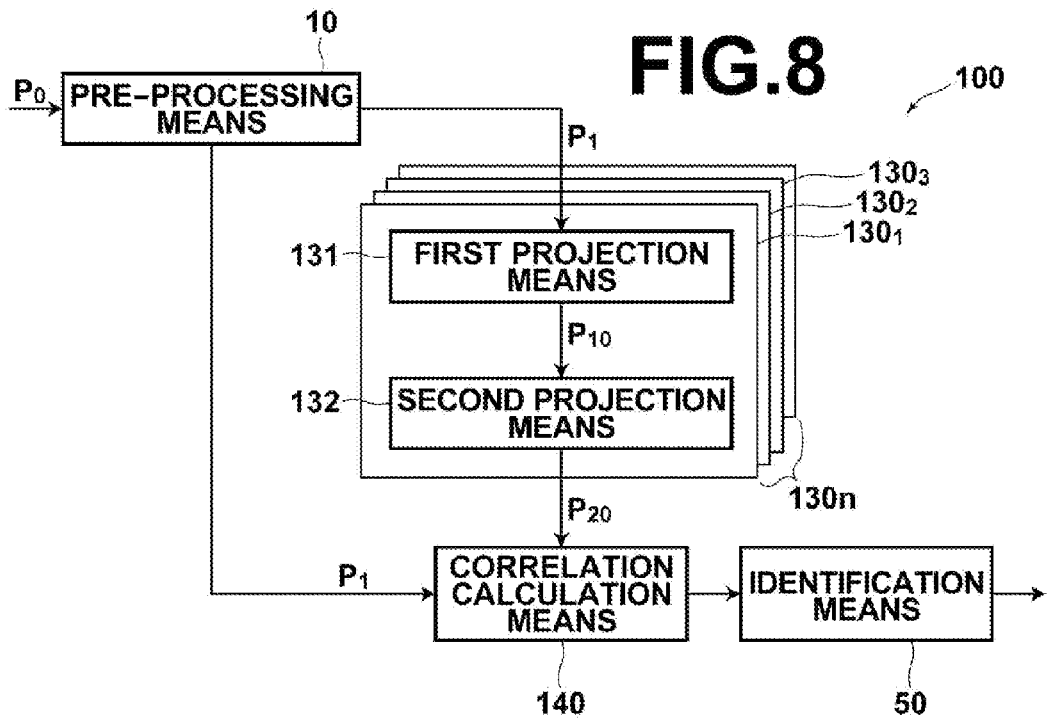

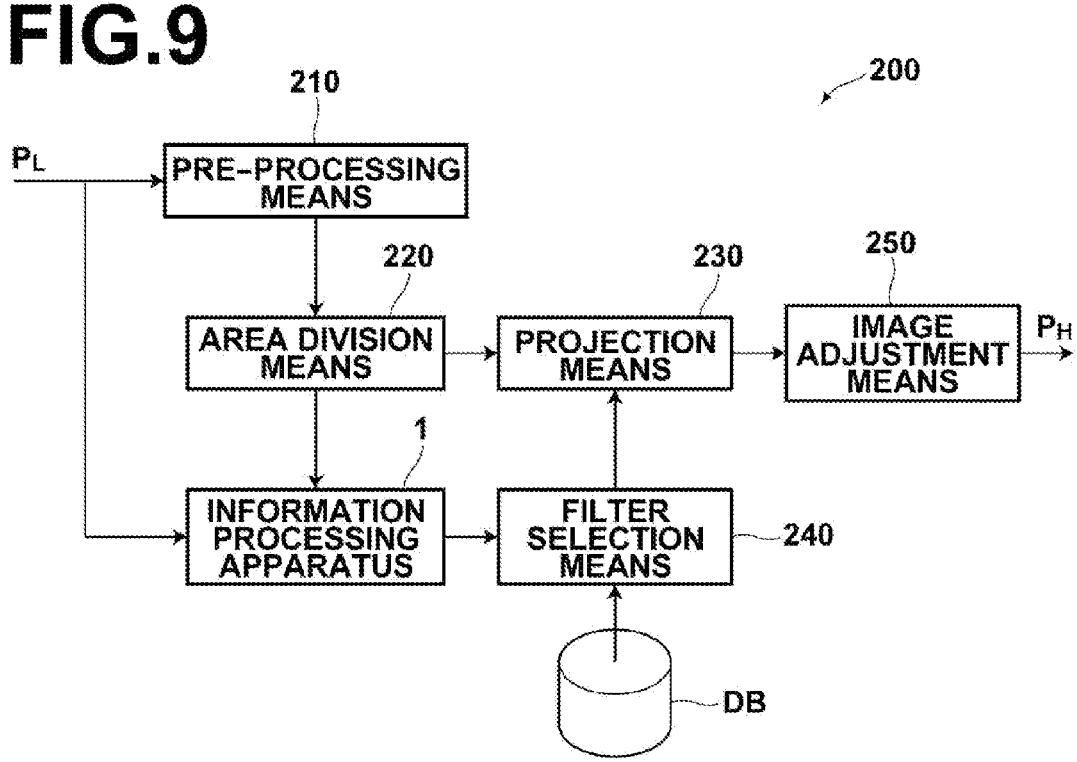

INFORMATION PROCESSING APPARATUS, METHOD, AND PROGRAM

BACKGROUND OF THE INVENTION

1. Field of the Invention

The present invention relates to an information processing apparatus, method, and program, and more particularly to modality identification for input data.

2. Description of the Related Art

It has been proposed to detect a particular object, such as a face or the like, from an image using principal component analysis (PCA) or singular value decomposition (SVD, HOSVD) as described, for example, in Japanese Unexamined Patent Publication Nos. 2006-092151 (Patent Document 1), 2009-134466 (Patent Document 2), 2005-133813 (Patent Document 3), and 2005-250863 (Patent Document 4). Patent Documents 1 and 2 describe a method of identifying an object by providing, in advance, a plurality of subspaces by a projection matrix learned through principal component analysis using sample data with respect to each object and, when an unknown image is inputted, identifying to which of the subspaces the unknown image belongs.

Patent Document 3 discloses a method for projecting an object based on principal component analysis to detect the object and estimating parameters of the object, such as the imaging direction and illumination direction of the object. Patent Document 4 describes a method in which a plurality of subspaces to be projected by a projection matrix is provided in advance using sample data representing a face at a predetermined position and sample data representing a face displaced from the predetermined position, and a determination is made as to which of a partial region cut out from a whole image or a region cut out at a position different from that of the partial region is correct.

In the conventional methods described in Patent Documents 1 to 4, an image is mapped into a feature vector space and a face or the like is detected from the distance of each class to subspace and the like in the feature vector space. Such conventional methods, however, have a problem that detection accuracy is degraded due to individual face differences or the like.

In view of the circumstances described above, it is an object of the present invention to provide an information processing apparatus and method capable of accurately and efficiently identifying a modality of input data. It is a further object of the present invention to provide a computer readable recording medium on which is recorded an information processing program for causing a computer to perform the information processing method described above.

SUMMARY OF THE INVENTION

An information processing apparatus of the present invention is an apparatus for identifying a modality of input data using a plurality of transformation matrix groups, each including a first projection matrix for projecting the input data into a space vector and a second projection matrix for projecting the space vector into projection data having a smaller dimension number than that of the space vector, learned through a plurality of sample data, each having the same modality for a non-identification target and a different modality for an identification target, with respect to each of the different modalities, the apparatus including:

a first projection means for projecting the input data into a plurality of space vectors using a plurality of the first projection matrices;

a second projection means for projecting the input data into a plurality of projection data using the plurality of transformation matrix groups and generating inverse space vectors by performing inverse projection of the second transformation matrix on the plurality of projection data;

a correlation calculation means for calculating a correlation between the space vector generated by the first projection means and the inverse space vector generated by the second projection means with respect to each transformation matrix group; and an identification means for identifying a modality represented by a transformation matrix group having a highest correlation calculated by the correlation calculation means as the modality of the input data.

Another information processing apparatus of the present invention is an apparatus for identifying a modality of input data using a plurality of transformation matrix groups, each including a first projection matrix for projecting the input data into a space vector and a second projection matrix for projecting the space vector into projection data having a smaller dimension number than that of the space vector, learned through a plurality of sample data, each having the same modality for a non-identification target and a different modality for an identification target, with respect to each of the different modalities, the apparatus including:

a first projection means for projecting the input data into a plurality of projection data using the plurality of transformation matrix groups;

a second projection means for generating a plurality of inverse projection data by performing inverse projection of the transformation matrix groups on the plurality of projection data generated by the first projection means;

a correlation calculation means for calculating a correlation between the input data and the inverse projection data generated by the second projection means with respect to each transformation matrix group; and an identification means for identifying a modality represented by a transformation matrix group having a highest correlation calculated by the correlation calculation means as the modality of the input data.

An information processing method of the present invention is a method for identifying a modality of input data using a plurality of transformation matrix groups, each including a first projection matrix for projecting the input data into a space vector and a second projection matrix for projecting the space vector into projection data having a smaller dimension number than that of the space vector, learned through a plurality of sample data, each having the same modality for a non-identification target and a different modality for an identification target, with respect to each of the different modalities, the method including the steps of:

projecting the input data into a plurality of space vectors using a plurality of the first projection matrices;

projecting the input data into a plurality of projection data using the plurality of transformation matrix groups and generating inverse space vectors by performing inverse projection of the second transformation matrix on the plurality of projection data;

calculating a correlation between the generated space vector and the generated inverse space vector with respect to each transformation matrix group; and identifying a modality represented by a transformation matrix group having a highest calculated correlation as the modality of the input data.

Another information processing method of the present invention is a method for identifying a modality of input data using a plurality of transformation matrix groups, each including a first projection matrix for projecting the input data into a space vector and a second projection matrix for projecting the space vector into projection data having a smaller dimension number than that of the space vector, learned through a plurality of sample data, each having the same modality for a non-identification target and a different modality for an identification target, with respect to each of the different modalities, the method including the steps of:

projecting the input data into a plurality of projection data using the plurality of transformation matrix groups;

generating a plurality of inverse projection data by performing inverse projection of the transformation matrix groups on the plurality of generated projection data;

calculating a correlation between the input data and the generated inverse projection data with respect to each transformation matrix group; and identifying a modality represented by a transformation matrix group having a highest calculated correlation as the modality of the input data.

A computer readable recording medium of the present invention is a medium on which is recorded an information processing program for causing a computer to identify a modality of input data using a plurality of transformation matrix groups, each including a first projection matrix for projecting the input data into a space vector and a second projection matrix for projecting the space vector into projection data having a smaller dimension number than that of the space vector, learned through a plurality of sample data, each having the same modality for a non-identification target and a different modality for an identification target, with respect to each of the different modalities, the program causing the computer to perform the steps of:

projecting the input data into a plurality of space vectors using a plurality of the first projection matrices;

projecting the input data into a plurality of projection data using the plurality of transformation matrix groups and generating inverse space vectors by performing inverse projection of the second transformation matrix on the plurality of projection data;

calculating a correlation between the generated space vector and the generated inverse space vector with respect to each transformation matrix group; and identifying a modality represented by a transformation matrix group having a highest calculated correlation as the modality of the input data.

Another computer readable recording medium of the present invention is a medium on which is recorded an information processing program for causing a computer to identify a modality of input data using a plurality of transformation matrix groups, each including a first projection matrix for projecting the input data into a space vector and a second projection matrix for projecting the space vector into projection data having a smaller dimension number than that of the space vector, learned through a plurality of sample data, each having the same modality for a non-identification target and a different modality for an identification target, with respect to each of the different modalities, the program causing the computer to perform the steps of:

projecting the input data into a plurality of projection data using the plurality of transformation matrix groups;

generating a plurality of inverse projection data by performing inverse projection of the transformation matrix groups on the plurality of generated projection data;

calculating a correlation between the input data and the generated inverse projection data with respect to each transformation matrix group; and identifying a modality represented by a transformation matrix group having a highest calculated correlation as the modality of the input data.

Here, the input data may be two-dimensional information, such as an image having a predetermined object, for example, face, character, graphic, symbol, texture, building, tile, branch, lung, blood vessel, and the like, or one-dimensional information, such as voice, pulsation, blood pressure, earthquake, and the like.

The modality as used herein includes anything having a given characteristic with a statistical bias, and includes, for example, not only the type of a subject of an image, such as face orientation, size, position, illumination condition, race, age, or gender but also the attribute of the subject, such as facial expression, behavior, posture, or a wearing object (glasses, sunglasses, mask, hat, or the like) of the imaged subject, voiced word, abnormal pulse, hypocenter, sound source, and the like.

Preferably, the transformation matrix group is a multilinear transformation matrix constituted by a plurality of space transformation matrices, including the first and second projection matrices.

Each of the information processing apparatuses described above may further include a pre-processing means for performing interpolation processing on the input data. Here, the pre-processing means may be a means that determines a sampling frequency according to detection accuracy of the identification means.

According to an image processing apparatus, method, and program of the present invention, when a modality of input data is identified using a plurality of transformation matrix groups, each including a first projection matrix for projecting the input data into a space vector and a second projection matrix for projecting the space vector into projection data having a smaller dimension number than that of the space vector, learned through a plurality of sample data, each having the same modality for a non-identification target and a different modality for an identification target, with respect to each of the different modalities, the input data are projected into a plurality of space vectors using a plurality of the first projection matrices, then the input data are projected into a plurality of projection data using the plurality of transformation matrix groups and inverse space vectors are generated by performing inverse projection of the second transformation matrix on the plurality of projection data, a correlation between the generated space vector and the generated inverse space vector is calculated with respect to each transformation matrix group, and a modality represented by a transformation matrix group having a highest calculated correlation is identified as the modality of the input data. This allows accurate detection of an object to be made by significantly eliminating individual differences included in the input data since an autocorrelation score is used as the index of detection by utilizing the nature that the space vector and the inverse vector become very similar to each other although they do not exactly correspond to each other.

Likewise, according to another information processing apparatus, method, and program of the present invention, when a modality of input data is identified using a plurality of transformation matrix groups, each including a first projection matrix for projecting the input data into a space vector and a second projection matrix for projecting the space vector into projection data having a smaller dimension number than that of the space vector, learned through a plurality of sample data, each having the same modality for a non-identification target and a different modality for an identification target, with respect to each of the different modalities, the input data are projected into a plurality of projection data using the plurality of transformation matrix groups, then a plurality of inverse projection data is generated by performing inverse projection of the transformation matrix groups on the plurality of generated projection data, a correlation between the input data and the generated inverse projection data is calculated with respect to each transformation matrix group, and a modality represented by a transformation matrix group having a highest calculated correlation is identified as the modality of the input data. This allows accurate detection of an object to be made by significantly eliminating individual differences included in the input data since an autocorrelation score is used as the index of detection by utilizing the nature that the input data and inverse projection data become very similar to each other although they do not exactly correspond to each other.

If each of the information processing apparatuses of the present invention further includes a pre-processing means for performing interpolation processing on the input data, and the pre-processing means determines a sampling frequency according to detection accuracy of the identification means, detection accuracy may be set high using the fact that modality identification sensitivity is high in the sampling direction.

BRIEF DESCRIPTION OF THE DRAWINGS

FIG. 7 is a flowchart illustrating a preferred embodiment of the information processing method of the present invention.

FIG. 8 is a block diagram illustrating another embodiment of the information processing apparatus of the present invention.

FIG. 9 is a block diagram of an example image processing apparatus that employs the information processing apparatus of the present invention.

DESCRIPTION OF THE PREFERRED EMBODIMENTS

Figure 1:
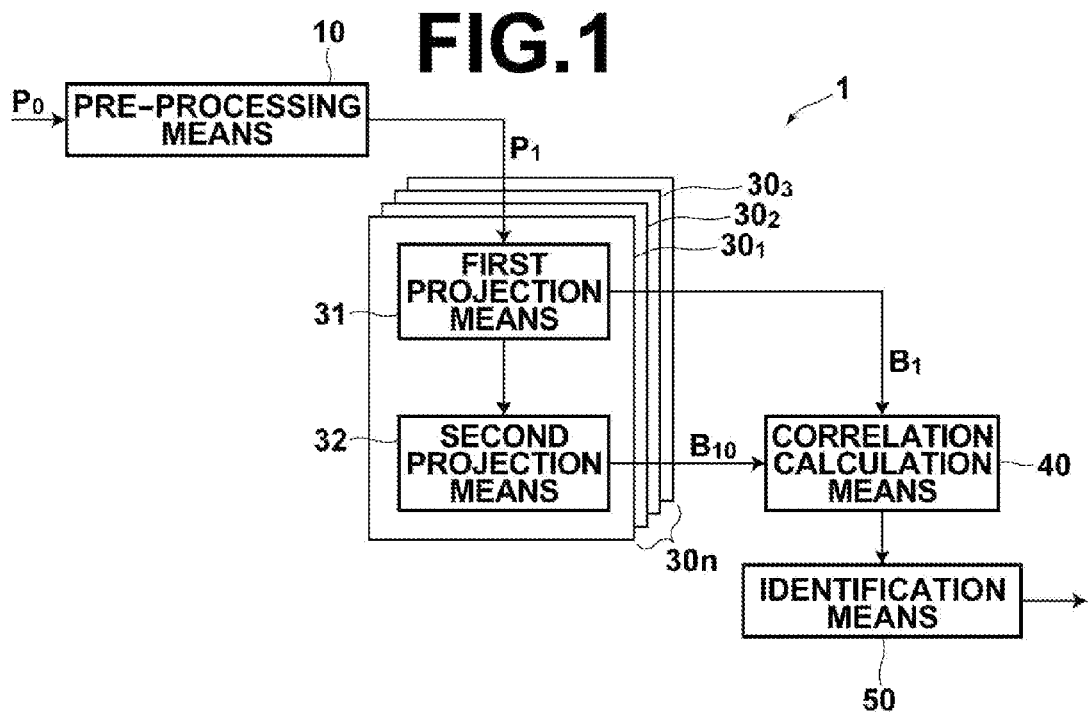
FIG. 1 is a block diagram of a preferred embodiment of the information processing apparatus of the present invention.

Hereinafter, embodiments of the present invention will be described with reference to the accompanying drawings. FIG. 1 is a block diagram of a preferred embodiment of information processing apparatus 1 of the present invention. Note that the configuration of information processing apparatus 1 is realized by executing information processing program read in an auxiliary storage device on a computer (e.g., personal computer or the like). The information processing program is stored in an information storage device, such as a CD-ROM or the like, or distributed through a network, such as the Internet or the like, and installed on the computer.

Information processing apparatus 1 is an apparatus for identifying a modality (state), such as the position, size, or orientation of a given object, such as a face or the like. For that purpose, information processing apparatus 1 includes pre-processing means 10, space transformation unit $30_n$, correlation calculation means 40, and identification means 50. Pre-processing means 10 enlarges or reduces an input image so as to conform to a standard image size and detected by an object detection means. Here, any known method, such as bi-cubic, B-spline, bi-linear, nearest neighbor, and the like, may be used as the enlargement or reduction method. Further, pre-processing means 10 may have a function to determine the sampling frequency according to the detection accuracy of identification means 50. This allows a small difference within interpolated input data to be detected using the fact that modality identification sensitivity is high in the sampling direction, to be described later, whereby identification accuracy may be set high.

Each space transformation unit $30_n$ is a unit for performing transformation processing using a transformation matrix $U_1 \cdot (\Sigma_{12} U_2^T)$ having a first projection matrix $U_1$ and a second projection matrix $(\Sigma_{12} U_2^T)$. The transformation matrix $U_1 \cdot (\Sigma_{12} U_2^T)$ is learned using a plurality of sample data, each having the same modality for a non-identification target and a different modality for an identification target. For example, where a position of an object (face) is intended to be identified, the transformation matrix $U_1 \cdot (\Sigma_{12} U_2^T)$ is provided for each group of a plurality of sample data which is different only in face position, as illustrated in FIG. 2.

Figure 3:
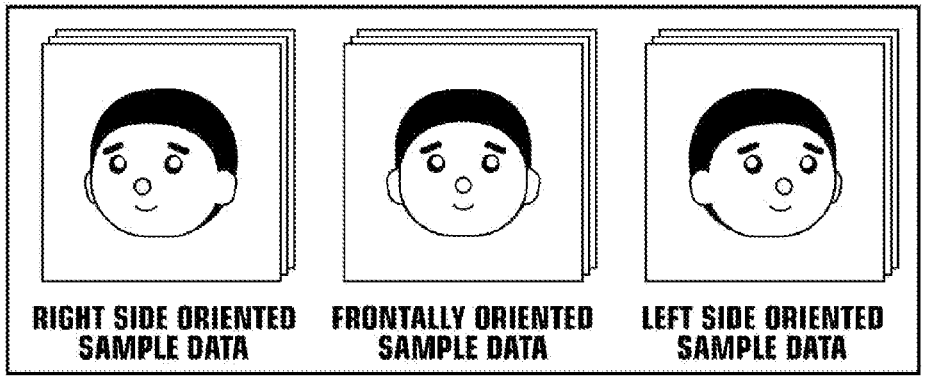
FIG. 3 is a schematic view illustrating, by way of example, a plurality of sample data for leaning a transformation matrix used for identifying a face orientation when the modality to be identified is face orientation.

More specifically, where a modality is to be identified with respect to each of the positions shifted by one pixel in up-down and left-right directions, a total of 9×9 transformation matrices (a plurality of space transformation units $30_1$ to $30_{81}$) are provided, like, for example, a transformation matrix $U_1 \cdot (\Sigma_{12} U_2^T)$ learned through sample data having a face in the center, a transformation matrix $U_1 \cdot (\Sigma_{12} U_2^T)$ learned through sample data having a face shifted to right by one pixel, and so on. Likewise, where an orientation of an object (face) is intended to be identified as the modality, a transformation matrix is generated using each group of a plurality of sample data having a different face orientation, as illustrated in FIG. 3. Further, as illustrated in FIG. 4, where a size of an object (face) is intended to be identified as the modality, a transformation matrix $U_1 \cdot (\Sigma_{12} U_2^T)$ is generated using each group of a plurality of sample data having a different face size.

Figure 2:
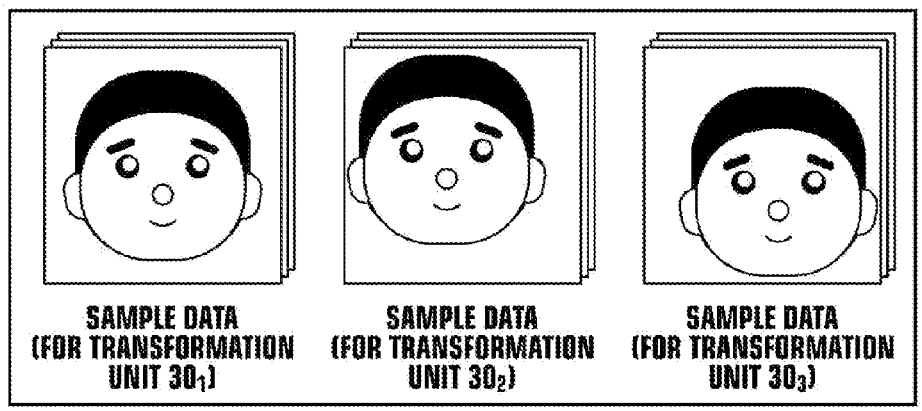
FIG. 2 is a schematic view illustrating, by way of example, a plurality of sample data for leaning a transformation matrix used for identifying a face position when the modality to be identified is face position.
Figure 4:
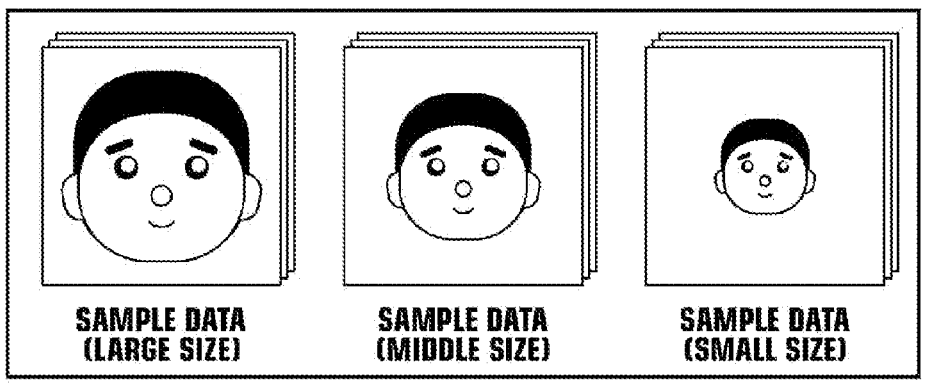
FIG. 4 is a schematic view illustrating, by way of example, a plurality of sample data for leaning a transformation matrix used for identifying a face size when the modality to be identified is face size.
Figure 5:
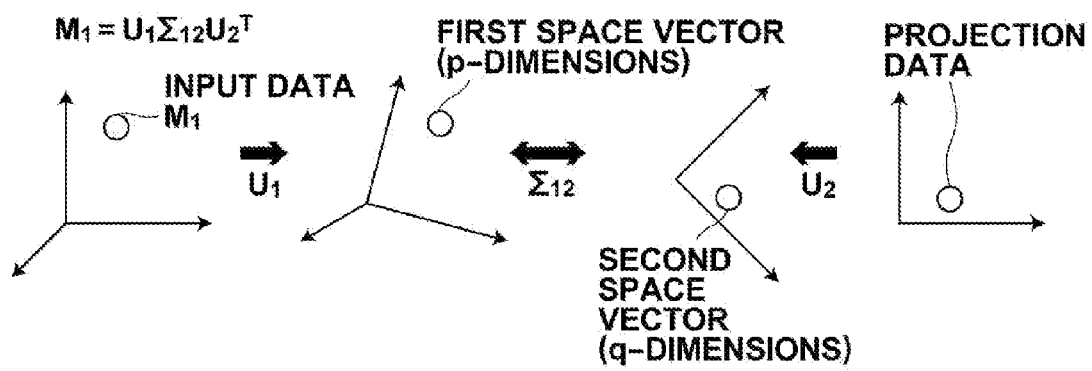
FIG. 5 is a conceptual diagram illustrating an example transformation by high order singular value decomposition (HOSVD).

The transformation matrix $U_1 \cdot (\Sigma_{12} U_2^T)$ between real space data of input data $P_1$ and an eigenspace vector is learned in advance by a known method, such as singular value decomposition, using sample data (FIGS. 2 to 4). For example, it is assumed that data stream $M_1$ can be represented by a multi-linear matrix $M_1 = U_1 \cdot (\Sigma_{12} U_2^T)$ and a plurality of learning image sets of normalized image groups is given thereto, as illustrated in FIG. 5. Then, the first projection matrix $U_1$ and the second transformation matrix $U_2^T$ are obtained by principal component analysis (PCA), singular value decomposition (SVD), or the like. Then, based on the first projection matrix $U_1$ and the second transformation matrix $U_2^T$, a (tensor) matrix $\Sigma_{12}$ is obtained. Here, a description has been made of a case in which the transformation matrix is learned by SVD or HOSVD, but the transformation matrix may be obtained by any known method, such as orthogonal LPP (Neighborhood Preserving Embedding, Isomap, Locally Linear Embedding, Laplacian Eigenmaps), and the like.

Each space transformation unit $30_n$ includes first projection means 31 and second projection means 32. First projection means 31 projects pre-processed input data $P_1$ using first projection matrix $U_1$ to transform pre-processed input data $P_1$ into p-dimensional space vector $B_1$. Second projection means 32 generates from the space vector $B_1$ transformed by first projection means 31 a plurality of q-dimensional projection data $P_{10}$ having a smaller dimension number than that of the space vector $B_1$ (q<p) using the second transformation matrix $\Sigma_{12}U_2^T$ and further performs inverse projection of ($\Sigma_{12}U_2^T$) on the projection data $P_{10}$ to generate inverse space vector $B_{10}$.

Correlation calculation means 40 calculates a correlation between space vector $B_1$ and inverse space vector $B_{10}$. Here, correlation calculation means 40 calculates a square cumulative sum or a cumulative sum of absolute values of the difference between the same dimensions of the two vectors of space vector $B_1$ and inverse space vector $B_{10}$ or the like as the correlation value. Identification means 50 identifies a modality represented by a space transformation unit $30_n$ having a highest correlation among those calculated by correlation means 40 for a plurality of space transformation units $30_n$ as the modality of input data $P_1$.

Figure 6:
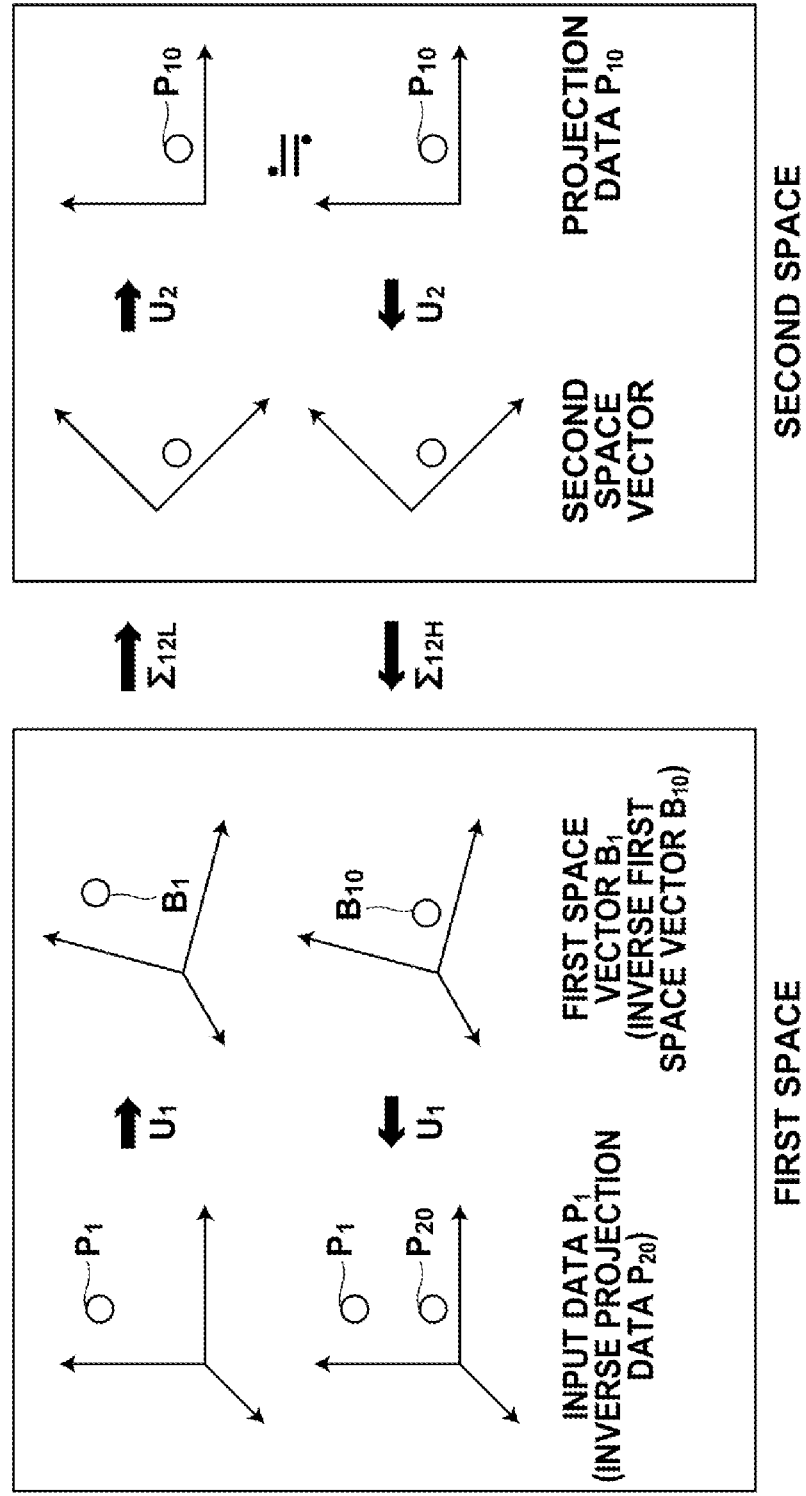
FIG. 6 is a conceptual diagram illustrating an example transformation by a modification of the high order singular value decomposition (HOSVD) shown in FIG. 5.

Here, the closer the modality represented by the sample data used for learning the transformation matrix $U_1 \cdot (\Sigma_{12}U_2^T)$ to the modality of the input data, the higher the correlation between space vector $B_1$ and inverse space vector $B_{10}$. That is, as illustrated in FIG. 6, in the transformation matrix $U_1 \cdot (\Sigma_{12}U_2^T)$ learned through sample data, space vector $B_1$ generated from sample data by first projection matrix $U_1$ and inverse space vector $B_{10}$ generated by projecting the sample data into the second space and then inversely projecting into the first space do not exactly correspond to each other, but they have the nature to become very similar to each other. This suggests that the closer the modality of input data $P_1$ to the modality of the sample data, the higher the correlation calculated by correlation calculation means 40. By utilizing this nature and using the correlation between space vector $B_1$ and inverse vector $B_{10}$ as the index, a determination is made as to how closely the modality of input data $P_1$ corresponds to that of the sample data.

This allows individual differences to be eliminated and the modality of input data $P_1$ to be identified accurately. That is, where the modality is detected by mapping input data $P_1$ into a space and the modality is detected based on the distance to a classifying class in the space as in the past, the space vector is changed due to individual differences of input data and the modality can not be detected accurately. In contrast, modality detection of input data $P_1$ with individual differences being eliminated may be performed by utilizing the fact that although space vector $B_1$ and inverse vector $B_{10}$ do not exactly correspond to each other but are very similar to each other when sample data are inputted to transformation matrix $U_1 \cdot (\Sigma_{12}U_2^T)$ using tensor transformation and detecting the modality of input data $P_1$ based on the correlation between input data $P_1$ and inverse projection data $P_{20}$.

Further, it is obvious that a positional relationship score of input data in a sample data group space can be obtained, and it is difficult to obtain a highly accurate autocorrelation score from a single object of only input without using the positional relationship with a sample data group. In the mean time, a significant speed-up may be achieved in comparison with a detection method in which characteristic positional relationships are obtained by matching all of the sample data with input and a residual with respect to sample data having a highest correlation is used as the index as in principal component analysis (PCA) and the like. Further, the dimension of space vectors $B_1$ and $B_{10}$ is reduced in comparison with the space of input data $P_1$, so that information with little contribution to the object detection, such as noise and the like may be eliminated and speed-up of the detection is realized.

FIG. 7 is a flowchart illustrating a preferred embodiment of the information processing method of the present invention. The information processing method will now be described with reference to FIGS. 1 to 7. First, when input data P is inputted, pre-processing is performed by pre-processing means 10 (step ST1). Then, with respect to pre-processed input data $P_1$, space vector $B_1$ and inverse space vector $B_{10}$ are generated for each space transformation unit $30_n$ (steps ST2, ST3).

Thereafter, a correlation between space vector $B_1$ and inverse space vector $B_{10}$ is calculated by correlation calculation means 40 (step ST4), and a modality represented by a space transformation unit $30_n$ having a highest correlation among a plurality of correlations is identified as the modality of input data $P_1$ by the identification means 50 (step ST5). In this way, by detecting a modality using the correlation between the space vector $B_1$ and inverse space vector $B_{10}$, accurate modality detection may be made with individual differences of input data $P_1$ being eliminated.

FIG. 8 is a block diagram illustrating another embodiment of the information processing apparatus of the present invention. Hereinafter, information processing apparatus 100 will be described with reference to FIG. 8. In FIG. 8, components identical to those of the information processing apparatus of FIG. 1 are given the same reference symbols and will not be elaborated upon further here. Information processing apparatus 100 differs from information processing apparatus 1 in that a correlation between real space data is calculated to perform identification in information processing apparatus 100.

That is, first projection means 131 in each space transformation unit $130_n$ performs a transformation through transformation matrix $U_1 \cdot (\Sigma_{12}U_2^T)$ to generate projection data $P_{10}$. In the mean time, second projection means 132 performs inverse transformation on projection data $P_{10}$ in the order of the second transformation matrix $\Sigma_{12}U_2^T$ and the first transformation matrix $U_1$ to generate inverse projection image $P_{20}$ (FIGS. 5 and 6). Then, correlation calculation unit 140 calculates a correlation between input data $P_1$ and inverse projection data $P_{20}$, and identification means 50 identifies a modality represented by a space transformation unit $130_n$ having a highest correlation as the modality of input data $P_1$. As described above, the calculation of correlation in a real space allows detection accuracy degradation due to individual differences in object to be prevented as in the case of FIG. 1 in which space vector correlation is calculated.

Note that information processing apparatuses 1 and 100 are applicable not only to an apparatus for detecting modality but also to a data transformation apparatus for reconstructing a high resolution image from a low resolution image based on modality detection results. FIG. 9 is a block diagram of example image processing apparatus 200 that employs an object detection apparatus and performs super resolution processing. Image processing apparatus 200 will now be described with reference to FIG. 9. Image processing apparatus 200 includes pre-processing means 210, image division means 220, projection means 230, image adjustment means 250, and the like.

Pre-processing means 210 performs pre-processing on an inputted low resolution image. For example, it performs size enlargement processing and high-pass processing. The size enlargement processing is processing for enlarging the size of the low resolution image to the size of the high resolution image. For this purpose, any known technology, such as bi-cubic, B-spline, bi-linear, nearest neighbor, or the like, may be used. The high-pass processing is processing for performing filtering on inputted low resolution image $P_L$ to suppress a low frequency region. For this purpose, any known technology, such as unsharp mask, Laplacian, gradient, or the like, may be used. This may reduce illumination changes present in a low frequency region and robustness against illumination changes may be improved. Limitation of the transformation target to a high frequency component from an entire frequency range allows the entire feature space that can be used for learning to be allocated to the high frequency component.

Image division means 220 generates a plurality of partial images by dividing whole image $P_L$ into a grid pattern. The purpose is to limit a super resolution processing target to a local area of the image and to allow the target to be handled at low dimensions, thereby making the super resolution processing to be high quality and robust against individual differences.

Projection means 230 generates a high resolution image for each partial image using a transformation matrix represented by Formula (1) given below which is learned based on a plurality of pairs of sample data, each including a low resolution sample image and a high resolution sample image.

$$P_H = \{S_1^{-1} \cdot (\Sigma_{12H} S_2^T) \cdot (\Sigma_{12L} S_2^T)^{-1} \cdot S_1\} \cdot P_L \quad (1)$$

Alternatively, as in high order singular value decomposition described with reference to FIGS. 5 and 6, the high resolution image $P_H$ may be generated by Formula (2) given below on the assumption that the vector in a first space generated by projecting pre-transformation sample data into the space using first transformation matrix $M_L$ and the vector in a second space generated by projecting post-transformation sample data into the space using second transformation matrix $M_H$ are substantially identical to each other with respect to each pair of sample data.

$$P_H = \{(M_H) \cdot (M_L)^{-1}\} \cdot P_L \quad (2)$$

Here, the filter database DE includes transformation matrices according to position, size, rotation, and orientation information, and filter selection means 240 selects an appropriate transformation matrix based on position, size, rotation, and orientation information of an object detected by information processing apparatus 1. Then, projection means 230 reconstructs an image through Formula (1) or Formula (2) given above using the transformation matrix selected by filter selection means 240 from the filter database DB. This allows high resolution processing to be performed using a filter coefficient appropriate for the modality of the object.

Image adjustment means 250 outputs a sum of high resolution images generated with respect to each modality of each object. Note that a weighted addition may be performed such that the influence of a high resolution image obtained with a large coefficient vector correction is reduced.

According to the embodiment described above, input data $P_1$ is projected into a plurality of space vectors $B_1$ using a plurality of first projection matrices $U_1$, then a plurality of projection data $P_{10}$ is generated from input data $P_1$ using a plurality of transformation matrix groups $U_1 \cdot (\Sigma_{12} U_2^T)$, inverse space vector $B_{10}$ is generated by performing inverse projection of second transformation matrix $(\Sigma_{12} U_2^T)$ on projection data $P_{10}$ with respect to each modality, a correlation between the generated space vector $B_1$ and inverse space vector $B_{10}$ is calculated with respect to each transformation matrix $U_1 \cdot (\Sigma_{12} U_2^T)$, and a modality represented by a transformation matrix $U_1 \cdot (\Sigma_{12} U_2^T)$ having a highest correlation is identified as the modality of the input data. This allows accurate detection of an object to be made by significantly eliminating individual differences included in the input data since an autocorrelation score is used as the index of detection by utilizing the nature that the space vector $B_1$ and inverse vector $B_{10}$ become very similar to each other although they do not exactly correspond to each other.

Likewise, according to information processing apparatus 100, information processing method, and information processing program shown in FIG. 8, a plurality of projection data $P_{10}$ is generated from input data $P_1$ using a plurality of transformation matrices $U_1 \cdot (\Sigma_{12} U_2^T)$, inverse projection data $P_{20}$ are generated by performing inverse projection of $U_1 \cdot (\Sigma_{12} U_2^T)$ on each of the generated plurality of projection data $P_{10}$, a correlation between input data $P_1$ and inverse projection data $P_{20}$ is calculated with respect to each transformation matrix $U_1 \cdot (\Sigma_{12} U_2^T)$, and a modality represented by a transformation matrix $U_1 \cdot (\Sigma_{12} U_2^T)$ having a highest correlation is identified as the modality of the input data. This allows accurate detection of an object to be made by significantly eliminating individual differences included in the input data since an autocorrelation score is used as the index of detection by utilizing the nature that the input data $P_1$ and inverse projection data $P_{10}$ become very similar to each other although they do not exactly correspond to each other.

Where pre-processing means 10 for performing interpolation processing on the input data is further provided and pre-processing means 10 determines the sampling frequency according to the detection accuracy of identification means 50, detection accuracy may be set high using the fact that modality identification sensitivity is high in the sampling direction.

Embodiments of the present invention are not limited to those described above. The description has been made of a case in which a face is used as the object. But, the object may be a region of a human body other than the face, such as head, hand, or the like, or a region of a living body other than human body. Further, the object may be a blood vessel or a particular tissue presents in a living body, a high molecule in a living body, such as tumor, tissue, cell, protein, DNA, or RNA, a low molecule, or the like. In addition, the input data may be a compound such as medicine or protein, money, card, such as cash card, vehicle, or car registration plate, or character, drawing, table, or photograph in a document scanned by a scanner such as a copier. Still further, a particular event in the outside world is shown as an example of the object, but the object may be anything as long as it has a statistical bias and, for example, a region having a given texture may be detected as an object.

Further, face orientation, size, position, or illumination condition is described, by way of example, as the modality of an object. But, the type of a subject, such as race, age, gender, or the like may be used as the modality. Further, the attribute of a subject, such as facial expression, behavior, posture, or a wearing object (glasses, sunglasses, mask, hat, or the like) of the imaged subject may be used as the modality of the object.

Further, the description has been made of a case in which super resolution processing is performed using detection results of the object detection means. But information processing apparatus may also be used for reduction processing with reduced alias components, multi-color processing, multi-tone processing, noise reduction processing, artifact reduction processing for reducing artifacts such as block noise, mosquito noise, and the like, blur reduction processing, sharpness processing, frame rate enhancement processing, dynamic range broadening processing, color tone correction processing, distortion correction processing, encoding, and the like.

What is claimed is:

1. An information processing apparatus comprising:
a processor, the processor being programmed to:
learn through each of a plurality of sample data sets and obtain a transformation matrix group including a first projection matrix for projecting input data into a space vector and a second projection matrix for projecting the space vector into projection data having a smaller dimension number than that of the space vector, for each sample data set that has been learned through, wherein each sample data set consists of a plurality of pieces of data which include information in a same state of non-identification target modality among the plurality of pieces of data and different states of identification target modality with respect to each other piece of data among the plurality of pieces of data;
generate a space vector by projecting the input data using the first projection matrix included in the transformation matrix group, for each of the obtained transformation matrix groups;
generate projection data by projecting the space vector using the second projection matrix included in the transformation matrix group, and generate an inverse space vector by performing inverse projection of the second projection matrix on the projection data, for each of the obtained transformation matrix groups;
calculate a correlation between the generated space and the generated inverse space vector, for each of the obtained transformation matrix groups; and
specify a transformation matrix group having a highest calculated correlation among the plurality of transformation matrix groups, and identify the state of identification target modality of the sample data set used in obtaining the specified transformation matrix group, as the state of identification target modality of the input data.

2. The information processing apparatus of claim 1, wherein each of the transformation matrix group is a multi-linear transformation matrix constituted by a plurality of space transformation matrices, including the first and second projection matrices.

3. The information processing apparatus of claim 1, wherein the processor is further programmed to perform interpolation process on the input data as a pre-process, and determine a sampling frequency according to the accuracy of the identification of the state of identification target modality.

4. The information processing apparatus of claim 2, wherein the processor is further programmed to perform interpolation process on the input data, as a pre-processor and determine a sampling frequency according to the accuracy of the identification of the state of identification target modality.

5. An information processing method comprising the steps of:
learning through each of a plurality of sample data sets and obtaining a transformation matrix group including a first projection matrix for projecting input data into a space vector and a second projection matrix for projecting the space vector into projection data having a smaller dimension number than that of the space vector, for each sample data set that has been learned through, wherein each sample data set consists of a plurality of pieces of data which include information in a same state of non-identification target modality among the plurality of pieces of data and different states of identification target modality with respect to each other piece of data among the plurality of pieces of data;
generating a space vector by projecting the input data using the first projection matrix included in the transformation matrix group, for each of the obtained transformation matrix groups;
generating projection data by projecting the space vector using the second projection matrix included in the transformation matrix group, and generating an inverse space vector by performing inverse projection of the second projection matrix on the projection data, for each of the obtained transformation matrix groups;
calculating a correlation between the generated space vector and the generated inverse space vector, for each of the obtained transformation matrix groups; and
specifying a transformation matrix group having a highest calculated correlation among the plurality of transformation matrix groups, and identifying the state of identification target modality of the sample data set used in obtaining the specified transformation matrix group, as the state of identification target modality of the input data.

6. A non-transitory computer readable recording medium on which is recorded an information processing program for causing a computer to perform the steps of:
learning through each of a plurality of sample data sets and obtaining a transformation matrix group including a first projection matrix for projecting input data into a space vector and a second projection matrix for projecting the space vector into projection data having a smaller dimension number than that of the space vector, for each sample data set that has been learned through, wherein each sample data set consists of a plurality of pieces of data which include information in a same state of non-identification target modality among the plurality of pieces of data and different states of identification target modality with respect to each other piece of data among the plurality of pieces of data;
generating a space vector by projecting the input data using the first projection matrix included in the transformation matrix group, for each on the obtained transformation matrix groups;
generating projection data by projecting the space vector using the second projection matrix included in the transformation matrix group, and generating an inverse space vector by performing inverse projection of the second projection matrix on the projection data, for each of the obtained transformation matrix groups;
calculating a correlation between the generated space vector and the generated inverse space vector, for each of the obtained transformation matrix groups; and
specifying a transformation matrix group having a highest calculated correlation among the plurality of transformation matrix groups, and identifying the state of identification target modality of the sample data set used in obtaining the specified transformation matrix group, as the state of identification target modality of the input data.

* * * * *